United States Patent [19]

Raitport

[11] 4,170,380

[45] Oct. 9, 1979

[54] ENERGY ABSORBING DEVICES TO BE USED ON VEHICLES TO PROTECT THE VEHICLE FROM DAMAGE (OR REDUCE DAMAGE) AND PROTECT THE PASSENGERS FROM FATALITY AND/OR INJURY

[76] Inventor: Eli Raitport, 1807 Mower St., Philadelphia, Pa. 19152

[21] Appl. No.: 334,153

[22] Filed: Feb. 20, 1973

[51] Int. Cl.² .............................................. B60N 1/08
[52] U.S. Cl. .................................. 296/65 A; 267/153; 293/117
[58] Field of Search ............... 267/159, 139, 140, 153; 280/150 B, 748, 750, 751, 752; 296/35 B, 28 R, 28 E, 65 R, 65 A; 188/1 B, 1 C; 74/110; 293/60, 64, 65, 69 R, 69 V, 71 R, 71 P, 1, 62; 61/48; 297/216; 114/219; 405/212

[56] References Cited

U.S. PATENT DOCUMENTS

| 879,198 | 2/1908 | Schirmer | 293/69 R X |
|---|---|---|---|
| 2,457,205 | 12/1948 | Campbell et al. | 188/1 C |
| 2,604,316 | 7/1952 | O'Brien et al. | 267/159 |
| 2,730,396 | 1/1956 | Johnson | 293/69 R X |
| 2,965,403 | 12/1960 | Barenyi et al. | 296/28 R X |
| 3,013,521 | 12/1961 | Hodges | 293/71 R X |
| 3,118,659 | 1/1964 | Paulsen | 267/153 X |
| 3,203,723 | 8/1965 | Montenare | 293/71 P X |
| 3,357,736 | 12/1967 | McCarthy | 297/216 X |
| 3,368,806 | 2/1968 | Szonn | 267/153 |
| 3,412,628 | 11/1968 | DeGain | 188/1 C X |
| 3,452,834 | 7/1969 | Gaut | 297/216 X |
| 3,524,678 | 8/1970 | De Lavenne | 280/150 B |
| 3,574,379 | 4/1971 | Jordan | 293/60 X |
| 3,582,594 | 6/1971 | Twyford | 267/159 |
| 3,610,609 | 10/1971 | Sobel | 293/60 |
| 3,695,629 | 10/1972 | Schlanger | 296/35 B |
| 3,716,999 | 2/1973 | Middelbeek | 267/140 X |
| 3,721,433 | 3/1973 | Sobel | 293/65 X |
| 3,744,835 | 7/1973 | Carbone et al. | 296/28 R X |
| 3,748,888 | 7/1973 | Gerich | 267/159 |
| 3,749,354 | 7/1973 | Raitport | 267/159 |

FOREIGN PATENT DOCUMENTS

1163168  2/1964  Fed. Rep. of Germany ........ 296/65 A

*Primary Examiner*—Trygve M. Blix
*Assistant Examiner*—Winston H. Douglas

[57] ABSTRACT

1. Heavy duty energy absorbing devices and energy absorbing bumpers for cars; how to mount them to existing cars and accommodate in the structure various shapes and sizes of existing bumpers on the cars.

2. Collapsible steering columns and collapsible tables for passengers.

3. Seats moving forward in event of collision and keeping the passengers and driver constantly restrained between the seat and collapsible steering column or table, without action by the passengers.

4. A safe car in which the chassis is extremely rigid and shatters in the event of an accident; and the passengers' module propels in top of the front end of the vehicle.

10 Claims, 38 Drawing Figures

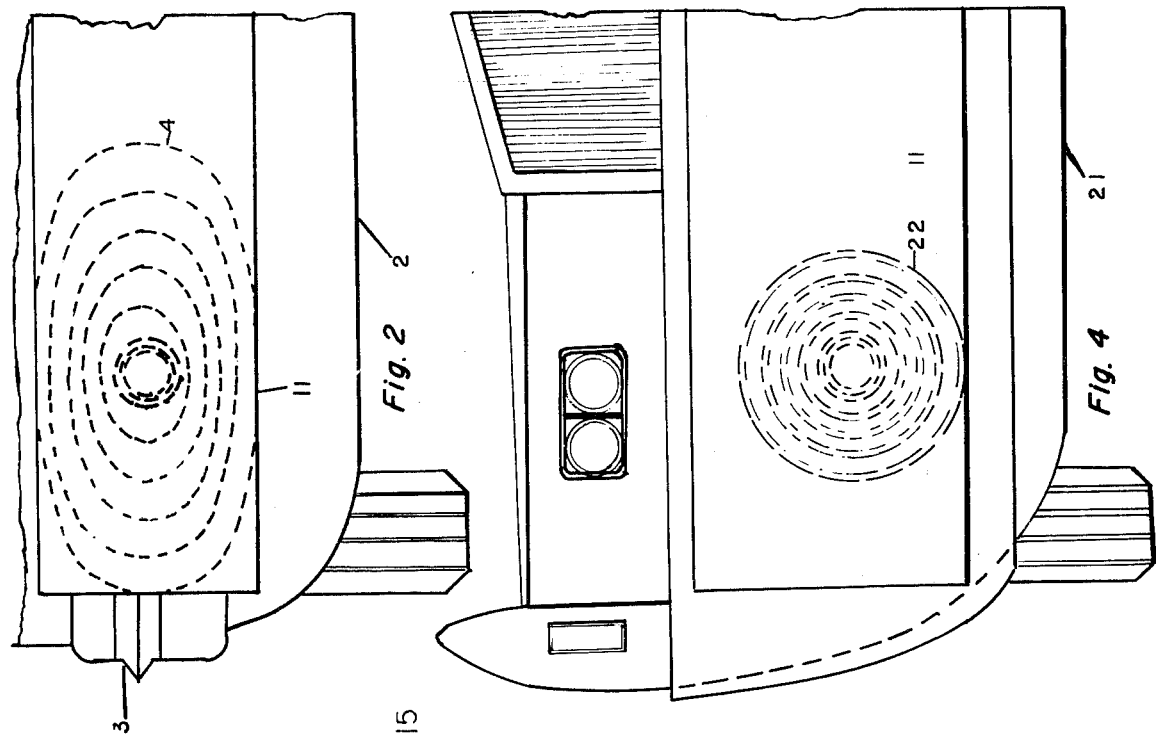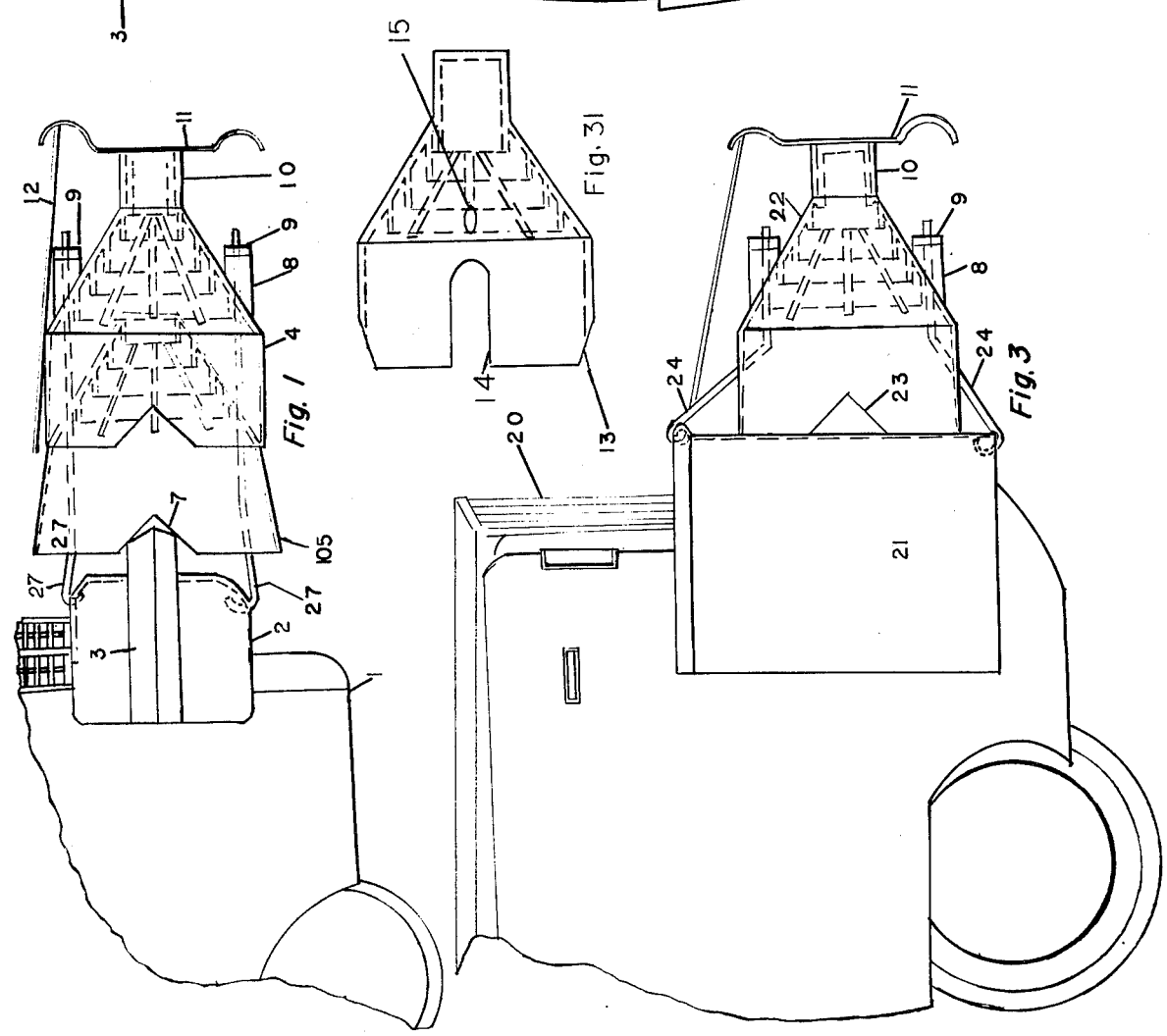

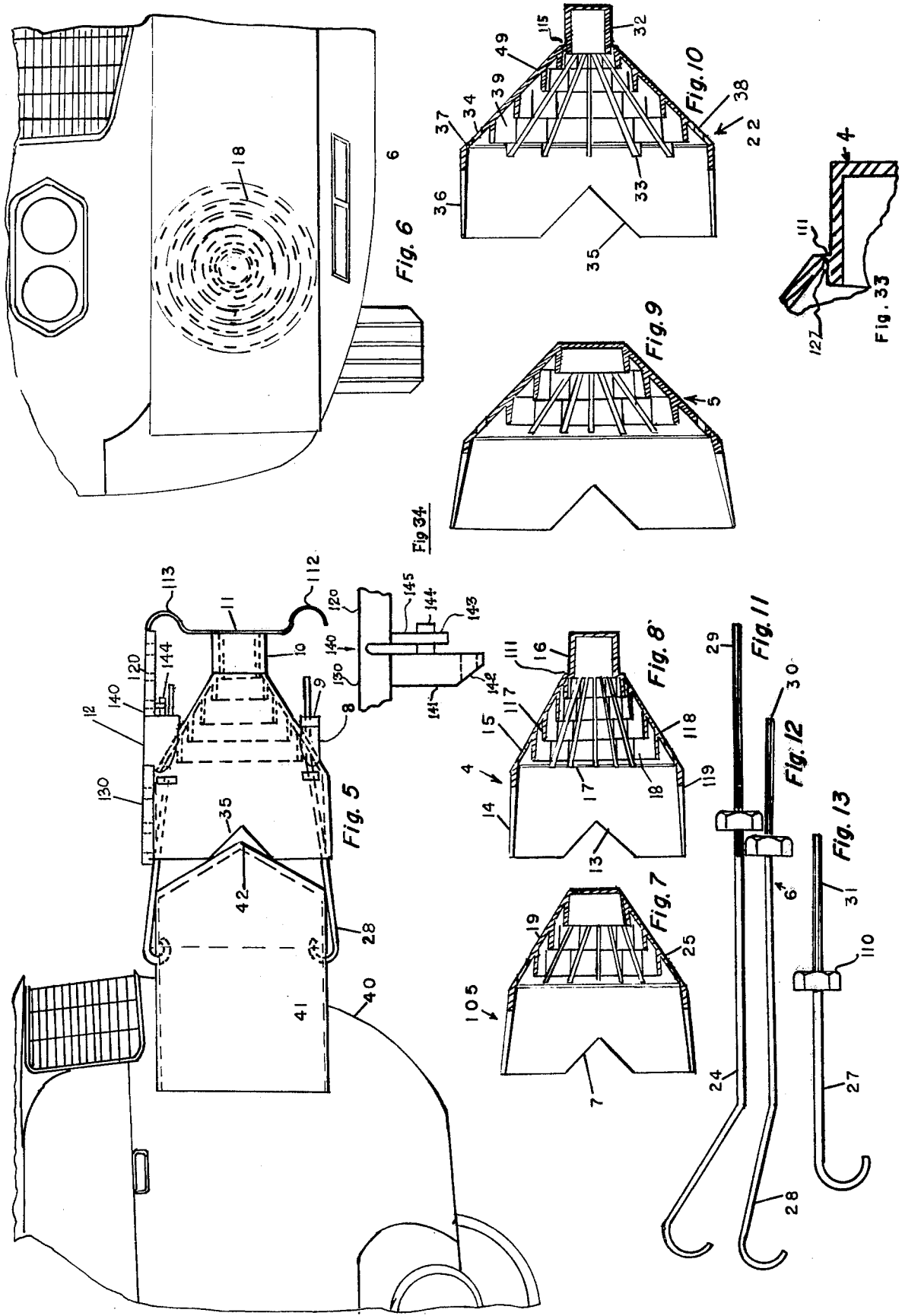

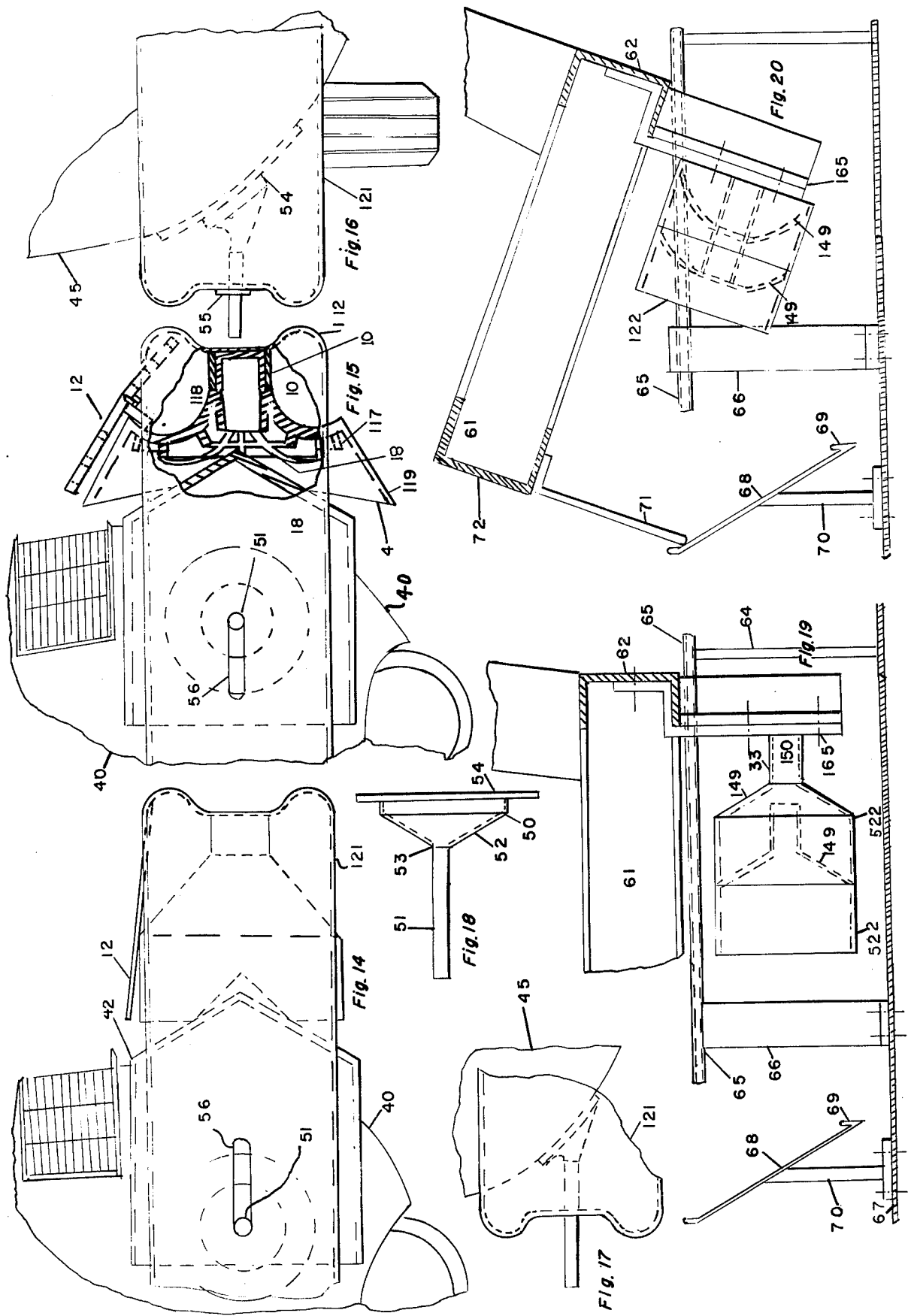

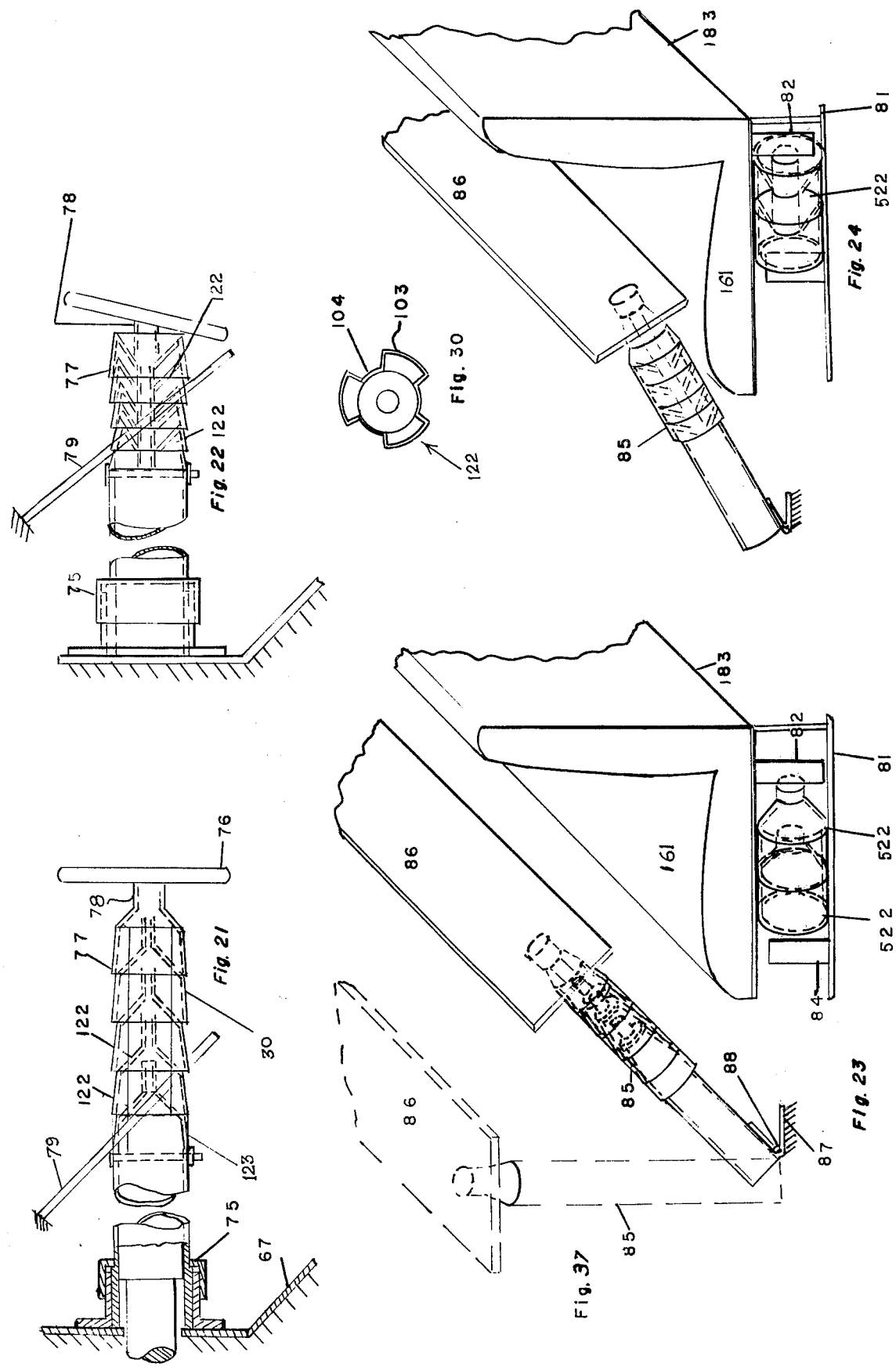

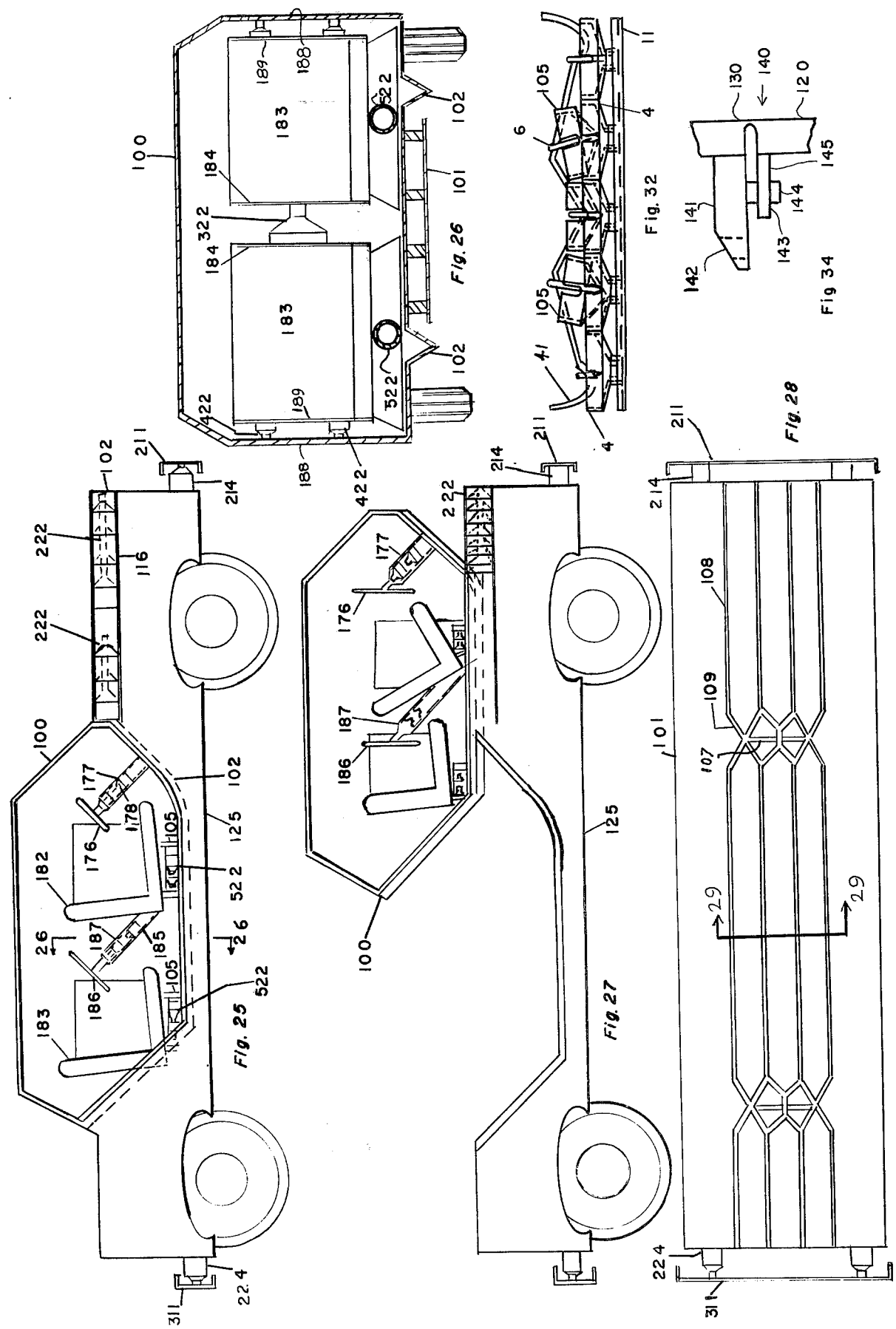

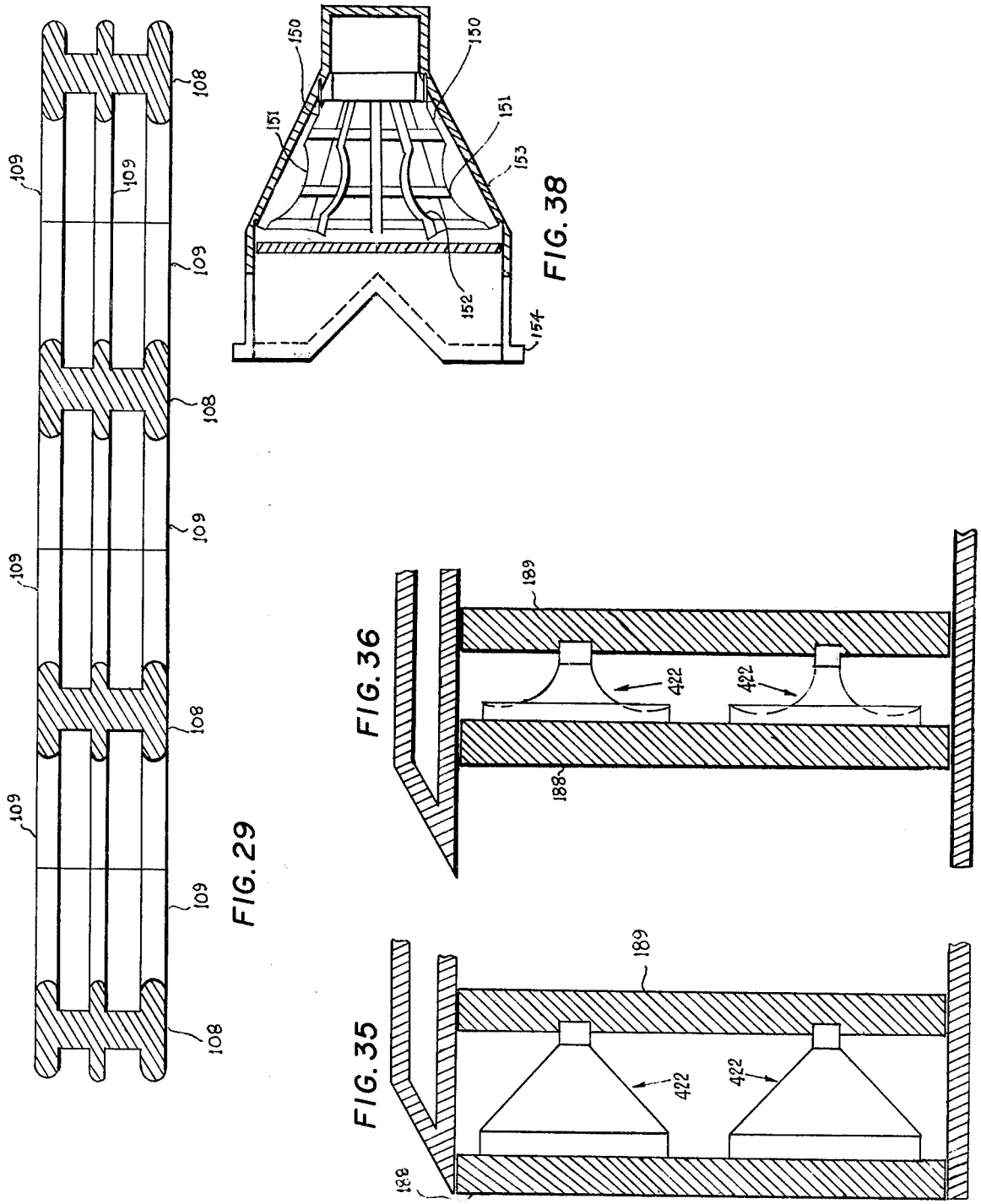

ENERGY ABSORBING DEVICES TO BE USED ON VEHICLES TO PROTECT THE VEHICLE FROM DAMAGE (OR REDUCE DAMAGE) AND PROTECT THE PASSENGERS FROM FATALITY AND/OR INJURY

BACKGROUND OF THE INVENTION

This invention relates to heavy duty energy absorbing devices of very inexpensive construction and their used specifically to safe vehicles and passengers from damage and injuries. Upon collision, some portions of the device compress, some stretch, some flex, buckle, etc., while the vehicle and passengers are allowed to continue to move and gradually decelerate reducing the G's to a safe level and keeping the car from destructive contact.

FIELD OF THE INVENTION

Energy absorption devices are basic mechanisms implemented in many types of machinery and utilized in all modes of transportation vehicles. Following are the seven major uses in industry:

1. Automobile bumper guards are energy absorption devices mounted on the front and rear bumpers of automobiles. The bumper guard protects the bumper of the vehicle and is commonly known as a safety protection device.

2. Devices used to protect motor vehicles and passengers are another type of energy absorption device that goes beyond protecting the bumper of the automobile. An example of this type device is the inflatable bag.

3. Shock absorption devices for automobiles are placed between the body and chassis of the vehicle so that the impact of shock from a rough, uneven road will be absorbed.

4. Shock absorption devices for aviation vehicles are used to buffer the impact of shock during the vehicle's landing.

5. Energy absorption devices in medium and heavy duty machinery are used to protect the machines from undue or rapid attrition.

6. Energy absorption devices for military vehicles and equipment (for example, military tanks) cushion the impact of shock to both the vehicle and the crew.

7. Vibration absorbers for structures, buildings, bridges, etc.

It is the purpose of this invention to teach how to make inexpensive energy absorbing devices in general and particularly energy absorbing devices for moving vehicles.

A snap device, which is an improved device over that disclosed in my application of Ser. No. 130,939, filed Apr. 5, 1971, and issued as U.S. Pat. No. 3,749,354 on July 31, 1973, is an excellent safety device for automobiles and other moving objects where energy absorption is required. Wherever deceleration is required, it is always desired to decelerate gradually, in order to avoid pick of G's. The present commonly used devices of appreciable performance are hydraulic shock absorbers with variable orifices. There are two objections to these: (1) They are relatively expensive; (2) All components involved in the system should be well aligned, otherwise the shock absorber will be damaged. Since it is not practical to align automobiles in a collision, the hydraulic shock absorbers used as an energy absorbing bumper would have a very short life in an automobile.

Springs and rubber pads are also used as shock absorbers. They convert rather than dissipate a considerable amount of kinetic energy into potential energy, which causes oscillation; sometimes the latter is more fatal than the original impact itself.

Rigid foam is also used as an energy absorbing element. However, the latter is consumated upon impact, which makes it expensive and impractical.

This invention suggests the use of snapping-like devices with two relaxed positions and pretravel. The kinetic energy is used up elastically to deform the snapping member and invert it into its second relatively relaxed position. Most energy would be converted into heat, which would then dissipate afterwards. Then the device would snap back into its original position.

The snap mechanism described in this disclosure is the most preferred for use as energy absorbing devices in automobiles because of its low cost.

Installed in three places: bumpers, seat suspension and steering column, hinging desks would provide safety for driver and passengers in collisions at a speed up to 40 m.p.h.

This energy absorbing device can be used to build safe vehicles capable of withstanding collisions up to 60 m.p.h. at which speed the occupants would be subjected to 27 G's only.

A multiple of these innovated snap devices mounted in series would provide the most smooth absorption of any amount of kinetic energy, since the amount of energy absorption by each device is precisely controlled by the thickness of this innovated snapping member and materials used.

The operation and construction of this invention and its use and mounting methods are further explained with references made to the drawings.

FIG. 1 depicts the side view of this invention including mounting accessories and cover used to mount it to a bumper of an existing car; the bumper of which has somewhat of a triangular projection.

FIG. 2 depicts a portion of the front view of FIG. 1 with the invented snap mechanism being in an elliptical shape.

FIG. 3 depicts a side view of the innovated snap device and cover.

FIG. 4 depicts the front view of FIG. 3.

FIG. 5 depicts a side view of the invention mounted to the front of a car in the event the original bumper is "U" shaped, and with the invention being of a circular shape.

FIG. 6 depicts a front view of FIG. 5.

FIG. 7 depicts sectional view of spacer in elliptical shape.

FIG. 8 depicts sectional view of the snap device in elliptical shape.

FIG. 9 depicts a sectional view of a circular spacer.

FIG. 10 depicts a sectional view of a snap device in circular shape.

FIG. 11 depicts the side view of a hook used for mounting this invention in event the original bumper of a car is wider than the snap device.

FIG. 12 depicts the side view of a hook used for mounting this invention in the event the invention is made approximately the same size as the original bumper of the car.

FIG. 13 depicts side view of a hook used for mounting in the event this invention is made narrower than the original bumper of the car.

FIG. 14 depicts this invention with a modified front cover bumper which is fixed to the fender of the car as well.

FIG. 15 depicts the position of this invention immediately after the collision.

FIG. 16 and FIG. 17 depict various positions of the suction-adhesive fastener as affected by various shapes of fenders.

FIG. 18 depicts side view of the suction adhesive fastener used in this invention.

FIG. 19 depicts side view of innovated drive seat assembly in normal position.

FIG. 20 depicts side view of the seat assembly at time of collision.

FIG. 21 depicts the steering column in normal position.

FIG. 22 depicts the position of the steering column after collision, showing the inverted snap devices.

FIG. 23 depicts isometrical view of the back seat of the car mounted on the snap devices and the table mounted on a collapsible column in normal position.

FIG. 24 depicts mechanisms of FIG. 23 in the position after collision.

FIG. 25 depicts side view of the "safe car", showing series of snap devices for the purpose of decelerating the cabin.

FIG. 26 depicts sectional view of the "safe car" in FIG. 25.

FIG. 27 depicts the side view of a "safe car" after the high speed collision.

FIG. 28 depicts the top view of the chassis of the "safe car".

FIG. 29 demonstrates the cross section of FIG. 28.

FIG. 30 depicts (sheet 4) front view of the modified snap device used in steering columns.

FIG. 31 depicts (sheet 1) top view of snap device 4, showing the hole and slot for mounting hook.

FIG. 32 (sheet 5) depicts top view of a portion of FIG. 1 demonstrating the arrangement of the snap devices and innovated spacers to accommodate triangular bumper of a car.

FIG. 33 (sheet 2) depicts an enlarged section of snap device 4 taken at the bottom of the cone at his connection with the stem.

FIG. 34 (sheet 5) depicts an enlarged portion of the side view of cover bumper 12.

FIG. 35 depicts enlarged view of the innovated safe double door in normal position.

FIG. 36 depicts the innovated door system after right-angle collision.

FIG. 37 demonstrates the position of the passenger table in swing open position.

FIG. 38 depicts a modified snap device.

The innovated energy absorbing mechanism (see FIGS. 1, 3 and 5) consists of the snap device 4, front bumper cover 11, top cover 12, hooks 27, 24 and 28, in the event the innovated mechanism is mounted on smaller, larger or the same size, respectively, bumper as that bumper originally on the car. 10 is the bushing perhaps welded to the bumper guard and it is used to connect the front guard 11 to snap device 4 or 22. 2 is the existing bumper of the car 1, which has an additional triangular trim 3. 105 is the spacer used to fill the gap created by odd shapes of original car bumpers. 17 and 18 respectively, are radial and circular reinforcing ribs in elliptical snap device 4 (FIG. 8) and 33 and 39 are horizontal and vertical reinforcing ribs of modified circular snap devices 22 (FIG. 10).

Snap device 22 (FIG. 10) consists of a cone 49, cup 36 joined by connecting line 37, hollow stem 32 connected to the cone 49 by a junction line 115. 37 and 115 are substantially reduced in thickness to achieve hinge-type flexibility in these places identically to that described in application Ser. No. 130,939. 34 and 38 are holes through which threaded portion 30 of the hooks 6 protrude to bear nut 9 for fastening of this invention to the existing bumper 41 of car 40 (see FIGS. 5, 10 and 12).

Due to variance of shapes and sizes of existing bumpers sometimes it might be necessary to use hook 24 (see FIG. 3); therefore, cup of the snap devices 22 and 4 have cut-outs 35 and 14 respectively (see FIG. 31). In the event the bumper of the existing car has peaks and valleys in horizontal plane, then spacers 5 and 105 (FIGS. 9 and 7) are used to fill the valleys, as shown in FIG. 32. Snap devices 4 and 22, as well as spacers 5 and 105 have "V" cut-outs, 13, 35 and 7, respectively, to accept high points on bumpers like 3 and 42 (FIGS. 1 and 5) and establish a stable condition after it has been mounted with the hooks and nuts. Washer 8 facilitates tightening of nut 9 against conical surface 49, 118 and 25 (see FIGS. 10, 8 and 7). The bumber front cover 11 is mounted on to the snap devices by means of bushings 10 which snag fit over stems 32 and 16 (FIGS. 5, 8 and 10) and it is recommended to preassemble that way, and said bushing 10 bears against the lending shoulder 111 (FIGS. 8 and 33). Then the threaded portion 29,30 or 31 of the hooks is protruded through the hole 15; then through hole 142 of the top cover 12, then nut 9 is mounted loosely. 110 is a stop nut on the hook to affix the size of the forward portion 24, 28 and 27 of the hooks. For the bottom portion bushing 8 is mounted on threaded portion of the hooks rather than cover 12. That way it could be shipped to the consumer.

All the consumer would have to do is (1) line up the assembly with the existing bumper; (2) get hold of the upper portions of the hooks (24,27 and 28, whichever the case might be) and move lock nut 110 to required position, in order to be able to hook on to the existing bumper of the car; (3) tighten nuts 9; and (4) press down 120° of the cover bumper (FIGS. 5, 11, 12, and 13).

When the car is colliding the bumper front cover 11 comes in contact with the object. (11 has curved portions 112 and 113 for maximum rigidity). The reaction force develops at front cover 11, then transmits through bushings 10 to the shoulder 111. Since the junction lines 37 and 115 (FIG. 10) are thin and flexible, bushing 10 pushes cone 49 inwardly compressing it, as well ridges 33 and 139, or 18 and 117 (FIG 8). Simultaneously the distance diminishes between the car and barrier allowing the car to move forward and gradually decelerate, The car 1 or 40 continues to move until snap device 4 becomes totally inverted as shown in FIG. 15. In that position snap device 4 is relatively and that prevents oscillation. During this transition of the form of the snap devices, 4 is compressed steadily and increasingly. This compression soaks up the kinetic energy of the car (See FIG. 15). Cup 119 spreads and lifts up top cover 112, which is for esthetic purposes, however it might prevent damage to the radiator of the car as well.

The cover 12 consists of a grill 140 having two integrally hinged halves, 120 and 130 (FIG. 34). From the half 130 is extending a projection 141 with an inclined surface accommodating surfaces of either cone 118 of the snap device 4 or cone 49 of the snap device 22. In this sloping portion is a hole 142 through which is fitted the threaded portion of the hook 6. In that way after nut 9 is affixed then to front bumper cover 11, snap devices 4 and 22, and top cover 12 are held as one assembly. From 141 perpendicularly are extending projections 144. Hinging portion 120 of the grill is fastened to the projections 144 by means of clips 145. Consequently the grill 12 covers up the snap devices, the nuts and the hooks.

In the event of accident the grill 12 pivots on the hooks (FIG. 15) because the hole 142 is considerably larger than the hook 6.

After the car pulls away from the obstacle devices 4 or 22 snaps back to its original position, because cone 118 is relatively compressed elastically (FIG. 15) and tends to return to its original position, which is commonly called "it has a memory." The speed at which it returns back profoundly depends on material used and thickness of junction lines 17 and 127 (FIGS. 8 and 33) and 37 and 115 in the event devices 22 are used. Although most thermoplastics are suitable materials for that snap device, polypropholyne is perhaps the best candidate because of its inexpensiveness and repeatable plyability. Increasing the thickness of junction lines 17 and 127 would mean to speed up return to original position, and require more energy to start the process of inverting the snap devices. On FIGS. 14, 15 and 16 is shown a modified front cover 121 which is bent around the front end of the car and it is also fastened to the fender 45 of the car 40, by means of suction adhesive cups shown in FIG. 18. The cup is molded from a pliable material like rubber and consists of a cone 52, flange 54 and stem 51. The junction lines 50 and 53 between the cone and the cup and stem and cone respectively are undercut. These undercuts facilitate for the stem 51 to accept an angular position as it is necessary in order to accommodate various angles of the fender 45 (See FIGS. 16 and 17). For mounting, the stem 51 is pushed in until cone 53 becomes convex, then flange 54 is glued to the fender. Then stem 51 is fitted in elongated hole 56 on the cover bumper 121 and pulled to create reduced pressure between the fender and the cup 52, so the cup is held to the fender by both suction and adhesion. To retain 121 to the stem 51 could be used any suitable means like a retaining ring, wire, sheet metal nut, etc., and is shown as 55 on FIG. 16.

At time of collision the bumper cover 121 backs up and borders hole 56 slide over stem 51 to the position shown in FIG. 15.

FIGS. 19 to 24 demonstrate the implementation of this basic invention to protect occupants of the car in collisions at higher speeds.

In addition, it offers a convenience to the passengers unmatched in any other system. While providing this convenience, the invention does not restrict the passengers or driver from any of their activities; nor is it a nuisance to them.

This system has three component parts which work together during an accident to protect all the occupants of the vehicle.

1. Steering wheel and collapsible steering column (FIGS. 21 and 22).

2. Collapsible and adjustable soft padded tables in both the front and rear of the car (FIGS. 23 and 24).

3. Movable seats 61 with back 83 in both the front and rear of the car (FIGS. 23 and 24).

The three components can be described as follows:

1. The collapsible steering column contains a snap mechanism 22 and 77 which causes it to contract in three stages during accidents. The steering wheel is made of a relatively soft padded material to prevent injury to the driver's chest and mid section, (steering wheel 76).

2. The soft padded tables 86 are mounted in the car similar to the steering column. Upon entering the car the table can be swung on its pivot 88 to allow easy access by the passenger (FIG. 29). The table surface is made of a relatively soft padded material to prevent injury to the occupants. It can be adjusted to tilt at an angle or be perfectly horizontal. The supporting legs 85 contain a snap mechanism similar to 122 which causes them to contract in three stages, similar to the one in the steering column.

3. The movable front and rear seats also contain snap mechanisms 522 under the seats which cause them to move forward in three stages and tilt upward front to back during accidents, so continuously containing the passenger till he is decelerated. (See FIG. 20)

The soft padded table 86 protects the driver and other occupants of the car by confining them between the seat and steering wheel or table (see FIG. 24). Most people are injured during accidents because they are thrown out of the car or they are violently shaken up within the vehicle. The confining aspect of this innovative table minimizes the possibility for such injury.

During an accident, the driver would be accelerated forward by inertia. Upon contact with the steering wheel, the column would begin to collapse. The first stage would release after an impact of 8½-9 m.p.h. and continue in sequence through the third stage. Because the seat will also be moving forward and upward, the driver would become confined between the seat and the steering wheel, but because of the soft composition of the wheel, he would not suffer injury to his chest or mid section. Most important in this sequence, the driver would be prevented from being thrown out of the vehicle by the force of the impact which causes oscillation.

The passenger in the front seat would be thrust forward in a manner similar to that of the driver in the event of an accident. The adjustable table in front of him will prevent the passenger from being hurled into the windshield where he might sustain serious injury. In addition, the fact that the passenger would be confined between the seat and the table would lessen the possibility that he might be thrown out from the car and eliminate the possibility of his being thrown around within the car.

In the rear seat, too, the passenger would become confined by the combined action of the seat and adjustable table as they work in harmony with each other to protect the occupants during an accident. Just as the passengers in the front seat, the occupants of the rear seat would enjoy similar protection.

Convenience is an accompanying, but a not to be forgotten, feature of the adjustable tables. They can be tilted to allow the passengers to place books, magazines, or road maps on them while they are reading. The surface can be used for writing or, when horizontal, for the placement of food and other items. In the rear, the table would be ideal for the placement of children's games. A clip-on attachment (not shown) will be an added convenience for holding beverages.

FIG. 30 depicts front view of device 122 used in steering column. These devices interlock with each other by means of projection 103 which fits into depression 104 of the next snap device 122. Therefore they are radially interlocked. The second snap device 122 is interlocked with the original steering column 75 through a coupling 123. 67 is the floor of the car. 79 is the conventional hanger-support of the steering column. 77 is a snap device similar to 122 molded in one piece with steering wheel 76. As alternate method, the steering wheel can be mounted on stem 78 protruding from snap device 77. Basically snap devices 77 and 122 are of the same construction as 4 and 22 with substantially thinner adjacent connecting lines between the stem and the cone and the cup. It could or could not be ribbed as described in subjected applications for snap devices 4 and 22, as it is suitable for particular application.

The operation of the front seat is a follows (See FIGS. 19 and 20):

Seat 61 with the back 83 is framed into 62 which glides on rails 65; the rails are in turn supported by columns 66 and 64, projecting from floor 67 of the car. Frame 62 is extended by a structure 165 to which are mounted snap devices 522 having a cone 149 and stem 150 for mounting to the frame 165. By means of bushing 33; the latter is suitably connected to 165. The second device 522 could be fastened to the first 522 by intermeshing projections like 103 and depressions 104 (FIG. 30) or by any other suitable means.

In a collision, due to inertia, seat 61 will advance forward since frame 62 and 72 would glide on rails 65. Structure 165 carries the snap devices 522 which hit plate 66 then compress and convex cones 149 in a similar way to that aforementioned for the bumpers 4 and 22; leg 71 glides upward on inclined bar 68 attached to the floor of the vehicle by means of column 70 (see FIG. 20). That is, in order to bend the driver's knees; it is necessary since often subconsciously the driver makes his legs rigid thrushing against the brakes, and that causes injury to the bones of the legs.

FIG. 33 (sheet 2) is enlarged section of the snap devices 4, demonstrating undercut 127 between the cone and the stem and shoulder 111 at which the bushing 10 is thrusting. The shoulder and undercut are peculiar to each snap devices 22, 122, 222, 322, 422 and 522.

The working principle for the safe vehicles is as follows:

The chassis of the vehicle is made in such a way that when colliding at high speed it will shatter rather than smash. The cabin with the occupants would then separate from chassis and ride upward and forward at least 5 feet. While this is occurring, the module would compress a series of SN-46 until the module would totally decelerate. The passengers would experience only 27 "G's" which is totally safe even for a person with a heart condition.

DESCRIPTION OF PREFERRED EMBODIMENT OF A SAFE PASSENGER CAR

Referring now to FIG. 28, there is shown a bumper 211 attached to an energy absorbing device 214 similar to 22 which in turn is attached to front end of the frame 101 of the automobile. Similar bumper 311 is attached to the rear end of the frame 101 through similar energy absorbing device 224. The responses of 214 and 224 are similar to that of 4 and 22 aforementioned (FIGS. 1, 3 and 5.) Now referring to FIG. 25 the passenger module 100 of the automobile 125 is relatively free to slide forward and upward on guide 102. These guides continue on to surface 116 located on top of front end of the vehicle 25. Snap devices 222, similar to those aforementioned 4 and 22 are movably placed along guides 102. Therefore, while module 100 travels over the plane 116, it compresses 222 in a manner similar to 4 and 22 (see FIG. 15) as aforementioned so that the vehicle 100 will gradually decelerate.

Inside the passenger module 100 are located front seat 182 and rear seat 183. The occupants of rear seat are compartmentalized by separations 184 between which are located energy absorbing devices 322 (similar to 22 and 222) as shown in sectional FIG. 26; but perhaps with considerably smaller resistance to compression. Compartments similar to rear seat are also provided for front seat occupants with separators 184 and devices 322.

Again referring to FIGS. 25 and 26, the passenger seats 183 and 182 are free to slide forward except for the resistance offered by energy absorbing devices 522 and friction. These devices 522 are firmly secured to floor of module 100 by means of beams 105. The module 100 is equipped with doors consisting of the panels 188 and 189, and energy absorbing devices 422 are located between the panels as shown in sectional FIG. 26. Devices 422 and 522 are similar to 322 mentioned above. The purpose of 422 and 322 is to protect the passengers and driver in a right angle collision, when the passengers are thrown against the doors of the vehicle. First of all, the impacting vehicle will be decelerated through compressing snap devices 422 (FIG. 5) in the identical process as it takes place with snap devices 4 and 22 in front end collisions aforementioned. The passenger might be thrown against the door panel but he wouldn't sustain injury because the panels 184 and 189 would not react to the impact of his body, but rather give in and move relatively slowly causing deceleration of the passenger's body.

The steering wheel 176 and table 186 will snap into previously described configuration at time of high speed accident as shown in FIGS. 22, 24 and 27, confining the occupant into a safe position. 176 is attached to energy absorbing steering column 177 which consists of several interlocked energy absorbing devices 178, similar to devices 122 (see FIG. 30). The operation of the devices 122 was previously described. The table 186 is supported by energy absorbing devices 185 and operates the same way as described for 86 and 85.

In FIGS. 35 and 36 is demonstrated the operation of the double door system. 188 is a panel which is fastened to 422 and upon impact by another car into the 188 panel, it moves inside toward 189, compressing device 422 as described for devices 4 and 22, into the position shown on FIG. 36.

Chassis 101 (FIGS. 28 and 29) is constructed (perhaps in a continuous steel casting) from double I beams 108, which have bent sections 109, to join each other into one highly rigid structure. They are then reinforced by a cross beam 107. This is to make the chassis uncollapsible-in the event of an accident they will shatter rather than collapse. Consequently, the body 125 and guides 102 would not become deformed, and so the module 100 would have the needed distance to travel, and thus avoid peak deceleration.

In FIG. 38 is shown a snap device similar to 4, but radial ribs 150 are modified from 117, because they are increased in the middle 151 in order to provide more stiffness. Disk 152 prevents complete snap-over (inversion of cone 153) that way assuring restoration to its original position. 154 is a flange to provide additional rigidity for the ring of the snap device.

It will be understood therefore that the specific description of the invention disclosed herein for purposes of illustration may be vitally varied within the spirit of the invention, which should accordingly be determined in scope by the following claims.

I claim:

1. An energy absorbing, elastically deforming device comprising a hollow cone at one end and a hollow cup being joined to the cone at the other end, said cone having one end of a larger diameter than the other end, both capable of deforming elastically whereas the larger diameter of said cone is connected to said cup by a relief portion, and whereas said cup encircles the joint line formed by said relief portion between said cone and said cup, and whereas the outside perimeter of said cone is within the inner perimeter of said cup, and whereas the longitudinal distance between the inner walls of said cup and the outside edge of said larger diameter of said cone is relatively short when compared to the respective lengths of the cone and the cup, said joint line being substantially thinner than the walls of said cone and cup, whereby force applied to said device biases the smaller diameter of said cone to move toward said cup and the outer edges of said larger diameter of said cone to bear against the inner walls of said cup, whereby said cone and said cup are elastically compressed and stretched, respectively.

2. An energy absorbing device as defined in claim 1 further comprising two members connected to each end of said device, respectively, wherein at least one said member is free to move upon the application of thrust on that member, whereby application of the thrust upon that said member causes said member to move and thereby subject said energy abosrbing device to compression.

3. An energy abosrbing device as defined in claim 1 further comprising a hollow stem integrally joined to the smaller diameter of said cone.

4. An energy aborbing device as defined in claim 1 further comprising reinforcement ribs on the walls of said device.

5. An energy absorbing device as defined in claim 1 wherein the thickness of the walls of said cone is gradually reduced toward its smaller diameter.

6. An energy absorbing device as defined in claim 1 further comprising a flange connected to said cup, whereas the surface of the flange is substantially perpendicular to the walls of the cup.

7. An energy absorbing device as defined in claim 1 further comprising a combination of a member subject to vibration whereby said energy absorbing device dampens the vibration of said member.

8. An energy absorbing device as defined in claim 1 in combination with a vehicle having a seat mounted on a slidable frame wherein said energy absorbing device is so fixed to restrict the sliding of said frame, said frame sliding forward transmits its kinetic energy to said energy absorbing device whereby upon collision of the said vehicle the seat will slide forward after the vehicle comes to a halt and thereby transfer its kinetic energy to the energy absorbing device which causes the seat to decelerate substantially less abruptly.

9. An energy absorbing device as defined in claim 1 in combination with a movable vehicle, said movable vehicle including at least two parts so constructed that either of said parts can move independently with respect to other of said parts whereby said energy absorbing device is located between said parts so as to absorb the momentum of the moving part.

10. An energy absorbing device as defined in claim 1 further comprising one member connected to either of the ends of said energy absorbing device such that said energy absorbing device serves as a protector for said member.

* * * * *